United States Patent
Cantini et al.

(10) Patent No.: US 11,876,476 B2
(45) Date of Patent: Jan. 16, 2024

(54) CONTROL SYSTEM OF A RIDEABLE SADDLE VEHICLE PROVIDED WITH ELECTRIC DRIVE

(71) Applicant: PIAGGIO & C. S.P.A., Pontedera (IT)

(72) Inventors: Jury Cantini, Pontedera (IT); Luca Carmignani, Pontedera (IT)

(73) Assignee: PIAGGIO & C. S.P.A., Pontedera (IT)

(*) Notice: Subject to any disclaimer, the term of this patent is extended or adjusted under 35 U.S.C. 154(b) by 104 days.

(21) Appl. No.: 17/605,173

(22) PCT Filed: Apr. 22, 2020

(86) PCT No.: PCT/IB2020/053798
§ 371 (c)(1),
(2) Date: Oct. 20, 2021

(87) PCT Pub. No.: WO2020/217184
PCT Pub. Date: Oct. 29, 2020

(65) Prior Publication Data
US 2022/0209692 A1   Jun. 30, 2022

(30) Foreign Application Priority Data
Apr. 23, 2019  (IT) .......................... 102019000006238

(51) Int. Cl.
*H02P 6/17* (2016.01)
*H02P 6/08* (2016.01)
(Continued)

(52) U.S. Cl.
CPC .................. *H02P 6/17* (2016.02); *H02P 6/08* (2013.01); *H02P 6/18* (2013.01); *B60L 2200/12* (2013.01); *B62K 11/00* (2013.01); *H02P 2203/03* (2013.01)

(58) Field of Classification Search
CPC ...... H02P 6/17; H02P 6/08; H02P 6/18; H02P 2203/03; H02P 6/181; H02P 6/182;
(Continued)

(56) References Cited

U.S. PATENT DOCUMENTS 6,342,769 B1   1/2002  Birkestrand
8,335,603 B2 * 12/2012  Mitsutani ................ B60L 3/003
                                                180/65.265
(Continued)

FOREIGN PATENT DOCUMENTS

CN   110011576 A   7/2019
DE   102014208527 A1  11/2015

OTHER PUBLICATIONS

International Search Report, dated Aug. 24, 2020, for corresponding International Patent Application No. PCT/IB2020/053798.

*Primary Examiner* — David Luo
(74) *Attorney, Agent, or Firm* — Amster, Rothstein & Ebenstein LLP

(57) ABSTRACT

A control system for an electrically-actuated, rideable saddle vehicle including an electric traction motor and a vehicle control system having two different speed acquisition systems. A first speed system includes a position sensor and controls power to the motor on a basis of a control signal, which is characteristic of torque selectively required by the electric motor. A second speed system includes Logic circuitry for estimating vehicle speed from estimated variations of a counter-electromotive force generated in the stator winding as a result of the rotor movement of the motor. The two systems allow optimizing control of the motor from both speed systems, or from that considered more reliable in a given operating condition, during operation of the vehicle. Illustratively, for low speeds, speed control may be based on (Continued)

sensor signals in the first speed system, while high speeds control may be based on the estimates from the logic system.

12 Claims, 4 Drawing Sheets

(51) Int. Cl.
 *H02P 6/18* (2016.01)
 *B62K 11/00* (2006.01)
(58) Field of Classification Search
 CPC ...... B60L 2200/12; B62K 11/00; B62M 6/45; B62M 6/50
 USPC .................. 318/400.14, 400.13, 400.01, 700
 See application file for complete search history.

(56) References Cited

U.S. PATENT DOCUMENTS

| | | | |
|---|---|---|---|
| 9,124,207 B2* | 9/2015 | Hayashi | ................ B62D 5/0403 |
| 9,806,661 B2* | 10/2017 | Najima | ................ H02P 29/032 |
| 10,840,842 B2* | 11/2020 | Iijima | ................ H02M 7/5395 |
| 2014/0097777 A1 | 4/2014 | Leong | |

* cited by examiner

CONTROL SYSTEM OF A RIDEABLE SADDLE VEHICLE PROVIDED WITH ELECTRIC DRIVE

CROSS REFERENCE TO RELATED APPLICATIONS

This application is a national phase of PCT application No. PCT/IB2020/053798, filed Apr. 22, 2020, which claims priority to IT patent application No. 102019000006238, filed Apr. 23, 2019, all of which are incorporated herein by reference thereto.

DESCRIPTION

The present invention relates to the field of motorcycles and rideable saddle motor vehicles. In particular, the present invention relates to a control system for a rideable saddle vehicle of the motorcycle, moped or tricycle type fitted with an electric drive and more precisely with at least one electric motor. The present invention further relates to a rideable saddle vehicle comprising such a control system.

BACKGROUND ART

One of the various types of motorcycles or, more generally, of rideable saddle vehicles, is that in which the propulsion takes place by using an electric motor instead of an endothermic engine. Typically, the electric motor comprises a permanent magnet rotor and a stator comprising a three-phase stator winding supplied by alternating currents. It is also known that a control unit is used to manage the operation of the electric motor for which a DC/AC electronic converter (inverter) is provided. The control unit establishes the values of the currents which must pass through the stator windings for the electric motor to deliver a given torque, i.e. for the speed of the electric motor, and therefore of the vehicle, to be increased or decreased. The control unit generates a Pulse-Width Modulation (PWM) type signal which is received as input by the inverter which supplies the electric motor based on this signal.

It is also known that it is necessary to know the relative position between the rotor and the stator windings, which form the stator phases, instant-by-instant to control a permanent magnet electric motor. For this reason, a physical sensor (e.g. a resolver or absolute encoder) is typically provided to measure the absolute position of the rotor with respect to the stator. At least if the electric motor is connected to the wheel, the position detected by the sensor is reprocessed by appropriate computing means to provide a signal which is characteristic of the speed of the electric motor or of the vehicle to the control unit of the electric motor.

However, the regulations governing the type-approval of electrically powered motorcycles require the provision of at least two vehicle speed reading/acquisition systems. This is to ensure the operation of the vehicle in the event of failure or tampering of either system. In particular, the regulations require such speed acquisition systems to be mutually independent and different from the point of view of engineering. In other words, such speed acquisition systems must detect the speed in the same manner and must not be constructively equal.

The Applicant has therefore identified the need to provide a technical solution capable of complying with the aforesaid regulation without such solution complicating the design of the vehicle. At the same time, the need has been found for a more reliable technical solution with regard to the speed reading of the vehicle.

SUMMARY

In view of the aforesaid considerations, it is the main task of the present invention to provide a control system for an electrically actuated rideable saddle vehicle which comprises at least two systems which are different from the point of view of engineering to detect/acquire the vehicle speed. As part of this task, it is a first object of the present invention to provide a vehicle control system in which the two speed acquisition systems of the motor vehicle do not have a significant impact on the configuration and therefore on the design of the vehicle. It is a yet further object of the present invention to provide a control system which is reliable and easy to manufacture at competitive costs.

The present invention is based on the general consideration of achieving the above-mentioned purposes by combining physical and logic reading means. For the purposes of the present invention, physical reading means a reading substantially of the traditional type, in which the speed is acquired by means of a physical position sensor which either directly or indirectly detects the position of the rotor with respect to the stator or the wheel with respect to a fixed element of the vehicle. Logic reading means, instead, indicate means for calculating the speed which is calculated based on an estimate of the variation of the electrical parameters which distinguish the operation of the electric motor and more precisely of the estimate of the variation of the counter-electromotive force which is generated in the stator winding as a result of the rotor movement.

In particular, the aforesaid task and objects are achieved by a rideable saddle vehicle comprising:
  an electric traction motor which includes a stator and rotor;
  a first vehicle speed measurement sensor configured to generate a first signal which is characteristic of the vehicle speed;
  a control system of the vehicle comprising;
  a first unit for supplying and controlling said electric motor, wherein said first unit supplies and controls said electric motor on the basis of a control signal, said control signal being characteristic of the torque required to said electric motor;
  a computing unit configured to generate a second signal which is characteristic of the speed of the vehicle, wherein said computing unit comprises first computing means configured to calculate the angular position of said rotor with respect to said stator on the basis of the counter-electromotive force produced by said electric motor, and wherein said second signal is generated on the basis of the value of said position calculated by said computing means;
  wherein said control signal is generated on the basis of a torque signal and on the basis of said first signal and/or said second signal which are characteristic of the speed of said vehicle.

In addition to meeting the type-approval standards mentioned above, the vehicle according to the invention is particularly reliable due to the presence of the two speed reading systems mentioned above. The first one, that of physical type, consists of the sensor means comprising a position sensor. The second one, that of the logic type, consists of the aforementioned computing unit. The presence of two systems allows optimizing the control of the electric motor because the information from both reading systems or from that considered more reliable for a given operating condition can be used for the operation of the electric motor. In this respect, according to a preferred embodiment, in the case of low speeds, the control may be based on the information provided by the physical reading system, while for high speeds the control may be based on the information provided by the logic system.

According to a possible embodiment, the sensor means comprise a position sensor adapted to detect the position of the wheel with respect to the wheel axle or, being the wheel directly connected by means of a cascade of gears to the electric motor, capable of detecting the position of the rotor with respect to said stator, and wherein said first signal is generated according to the value of said position detected by said position sensor.

According to a possible embodiment, the computing unit comprises processing means electrically connected to said computing means; said processing means receiving at the input a signal sent by said computing means and generating at the output said second signal which is characteristic of the speed of said vehicle.

According to a possible embodiment, the second control unit comprises a first processing module which receives at the input such signals which are characteristic of the speed of said vehicle, wherein said first module compares said signals generating at the output a reference signal of the speed of said vehicle;

a second processing module which receives at the input said reference signal generated by the first module and a reference torque signal set by the driver of said vehicle; the second module generates at the output a control signal which is characteristic of the torque required to the electric motor.

Preferably, the first supply and control unit of the electric motor comprises an inverter module electrically connected to the electric motor to determine the drive.

Preferably, the first unit comprises a sensor module electrically connected to said inverter module and the computing means of the computing unit, wherein said sensor module comprises sensors which detect the electric parameters of said inverter module and supplies a signal which is characteristic of the value of the electric parameters to said computing means.

According to a possible embodiment, the first control unit and supply of the electric motor further comprises:

a first computing module which receives at the input said signals which are characteristic of the speed, wherein said first computing module generates a signal which is characteristic of the position of said rotor with respect to said stator;

a second computing module which receives at the input said signal generated by said first computing module and said control signal generated by the second control unit, wherein said second computing module generates a control signal received at the input by said inverter module.

According to an embodiment, the control signal which supplies and controls the electric motor is generated on the basis of the operating conditions of the vehicle and, in particular, its speed.

In particular:

when the vehicle speed is lower than a first speed threshold, the control signal is generated only on the basis of said torque signal and on the basis of said first characteristic speed signal of said vehicle;

when the vehicle speed is higher than or equal to a second speed threshold, the control signal is generated only on the basis of said torque signal and on the basis of said second characteristic speed signal of said vehicle;

when the vehicle speed is higher than or equal to said first speed threshold and lower than said second speed threshold, the control signal is generated on the basis of said torque signal and on the basis of said first signal and said second signal which is characteristic of the speed of said vehicle.

LIST OF DRAWINGS

Further features and advantages of the invention will become more apparent from the discussion of the following detailed description of some preferred, but not exclusive embodiments of the motorcycle, disclosed by way of non-limiting example, with reference to the accompanying drawings, in which.

The elements or parts of elements in common between the figures will be indicated by the same reference numerals in the figures.

DETAILED DESCRIPTION

Figure 1:
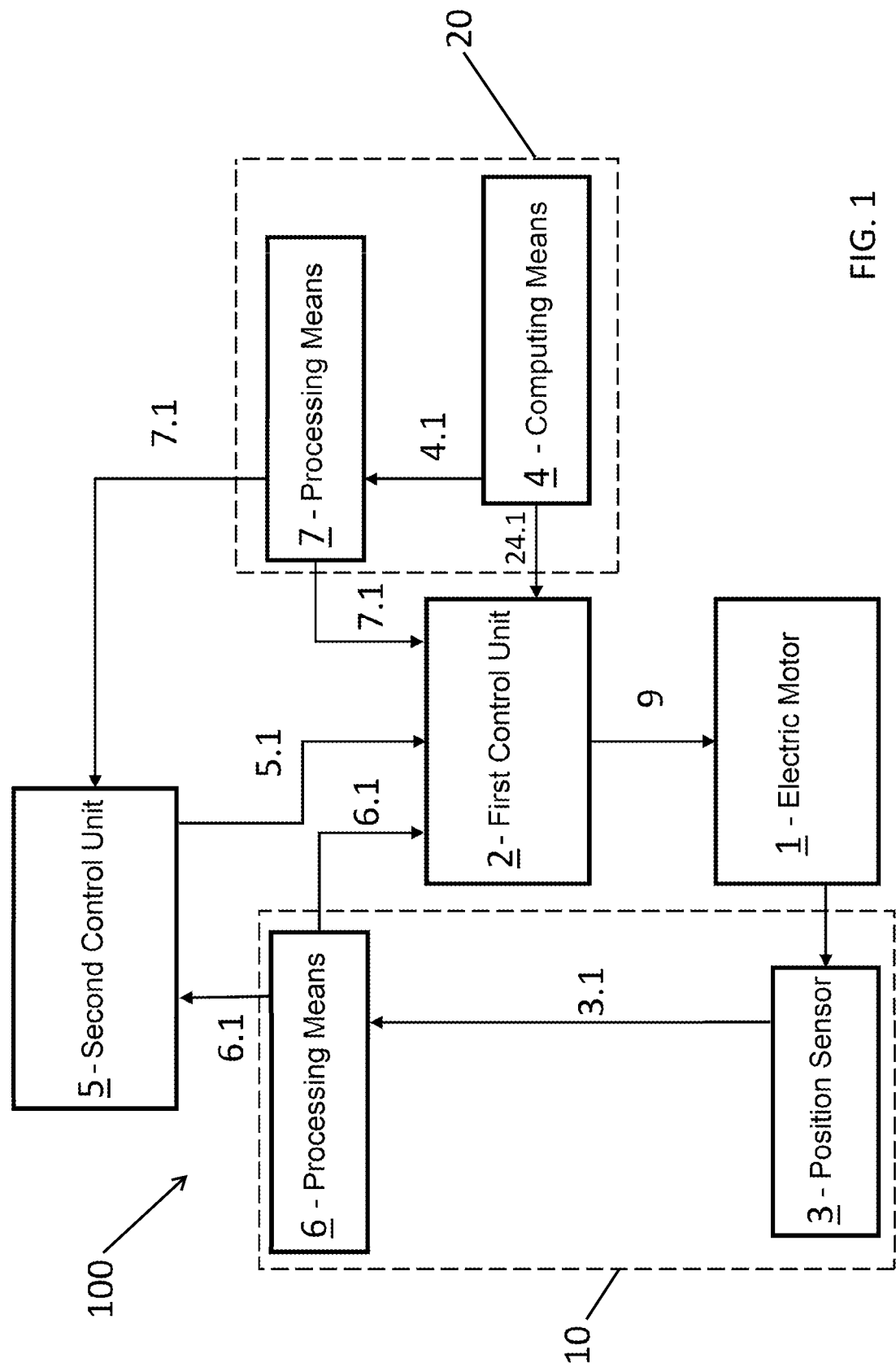
FIG. 1 is a block chart of a control system of a motorcycle according to the present invention.

With reference to the aforesaid figures, a motorcycle comprising a control system 100 according to this invention is indicated by reference numeral 200. The control system can be implemented on any rideable saddle vehicle, be it moped, motorcycle, tricycle equipped with an electric drive, i.e. whose propulsion is generated by an electric motor, indicated in the figures by reference numeral 1. The electric motor 1 comprises a stator and a rotor, with permanent magnets, rotating about the axis thereof with respect to the stator. According to a solution known per se, the stator comprises a three-phase stator winding which can be supplied with alternating currents to determine the rotation of the rotor.

The control system according to the invention comprises a first unit 2 for supplying and controlling the electric motor 1 and a second unit 5 for controlling the motorcycle. The second unit 5 has the function of managing the instrument cluster and/or of transferring the vehicle speed information thereto. At the same time, the second unit 5 forms a dialog interface for the user/driver which sets the operation of electric motor 1 (acceleration, deceleration, etc.) therethrough. In other words, the second unit 5 receives the information from the driver about whether the vehicle, i.e. the electric motor 1, will accelerate or not.

The two units 2 and 5 are electrically communicating. In particular, the second unit 5 generates at the output a control signal 5.1 which is characteristic of the torque required to the electric motor 1 or the required speed variation. The first unit 2 receives at the input said control signal 5.1 to supply and control the stator windings of electric motor 1, also based on the real speed of the vehicle.

According to the present invention, the control system 100 comprises sensor means shown as a whole in FIG. 1 by the dotted block and reference numeral 10. Such sensor means 10 comprise at least one position sensor 3 which detects the position of a moving part, the speed of which is characteristic of the speed of the motorcycle. The position sensor 3 may be placed on the wheel of the vehicle 200 or the rotor of the electric motor if it is connected by means of a mechanical transmission to the wheel of the vehicle 200. The sensor means 10 further comprise processing means 6 for processing the signal 3.1 supplied by the position sensor 3 and generating a first signal 6.1 which is characteristic of the speed of the motorcycle. In particular, the signal 6.1 is processed as a time derivative of the position detected by the position sensor 3.

The control system 100 further comprises a computing unit, shown as a whole in FIG. 1 by the dashed block associated with reference numeral 20. The computing unit 20 is configured to generate a second 7.1 signal which is characteristic of the speed of said vehicle. The computing unit 20 comprises computing means 4 configured to calculate the angular position of the rotor of the electric motor rotor 1 in relation to the stator. In particular, such calculation is based on the estimation of the counter-electromotive force generated on the stator phases by the magnets present on the rotor. In essence, the computing means 4 are configured to estimate the position of the rotor with respect to the stator according to the electric motor model 1 and according to the electrical parameters (current and/or voltage intensity) affecting the operation of the first unit 2 in charge of supplying and controlling the same electric motor 1.

The computing unit 20 comprises processing equipment 7 electrically connected to the computing means 4 to receive at the input a signal 4.1 which is characteristic of the angular position calculated by the computing means 4 themselves. On the basis of such an angular position, the processing means 7 generate the second signal 7.1 which is characteristic of the speed of the motorcycle. The speed estimated by the processing means 7 is obtained as a derivative of the position, in this case not detected but rather calculated by the computing means 4 on the basis of the counter-electromotive force generated by the rotation of the rotor.

In other words, the second signal 7.1 derives from an angular position calculation based on electrical parameters and not on a detection of the position of a rotating component by a physical sensor.

According to the invention, the second unit 5 and the first unit 2 are connected to the sensor means 10 and the computing unit 20 to receive at the input the first signal 6.1 and the second signal 7.1 which are characteristic of the speed of the motorcycle.

Figure 3:
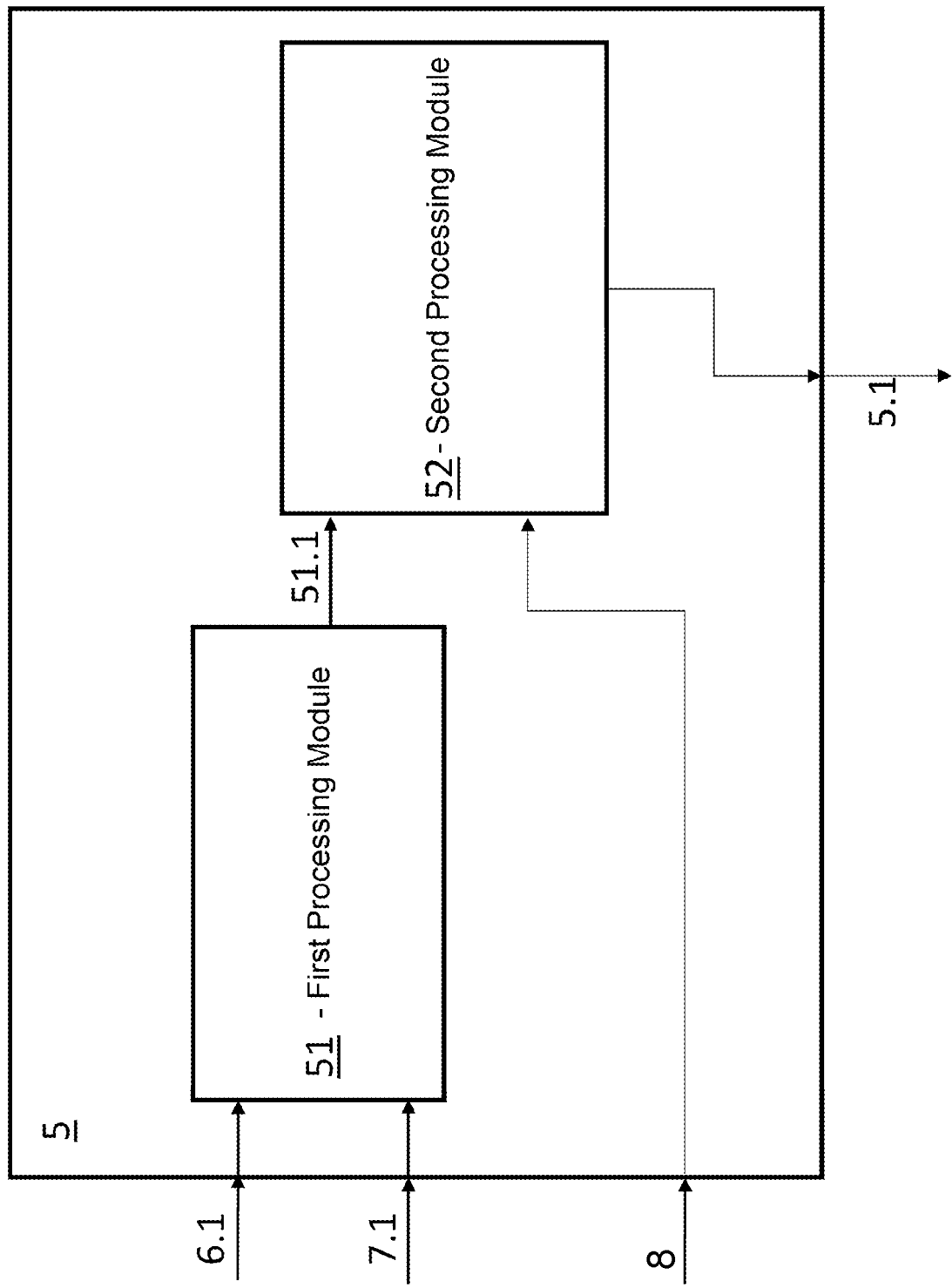
FIG. 3 is a block chart of another one of the blocks in FIG. 1.
Figure 4:
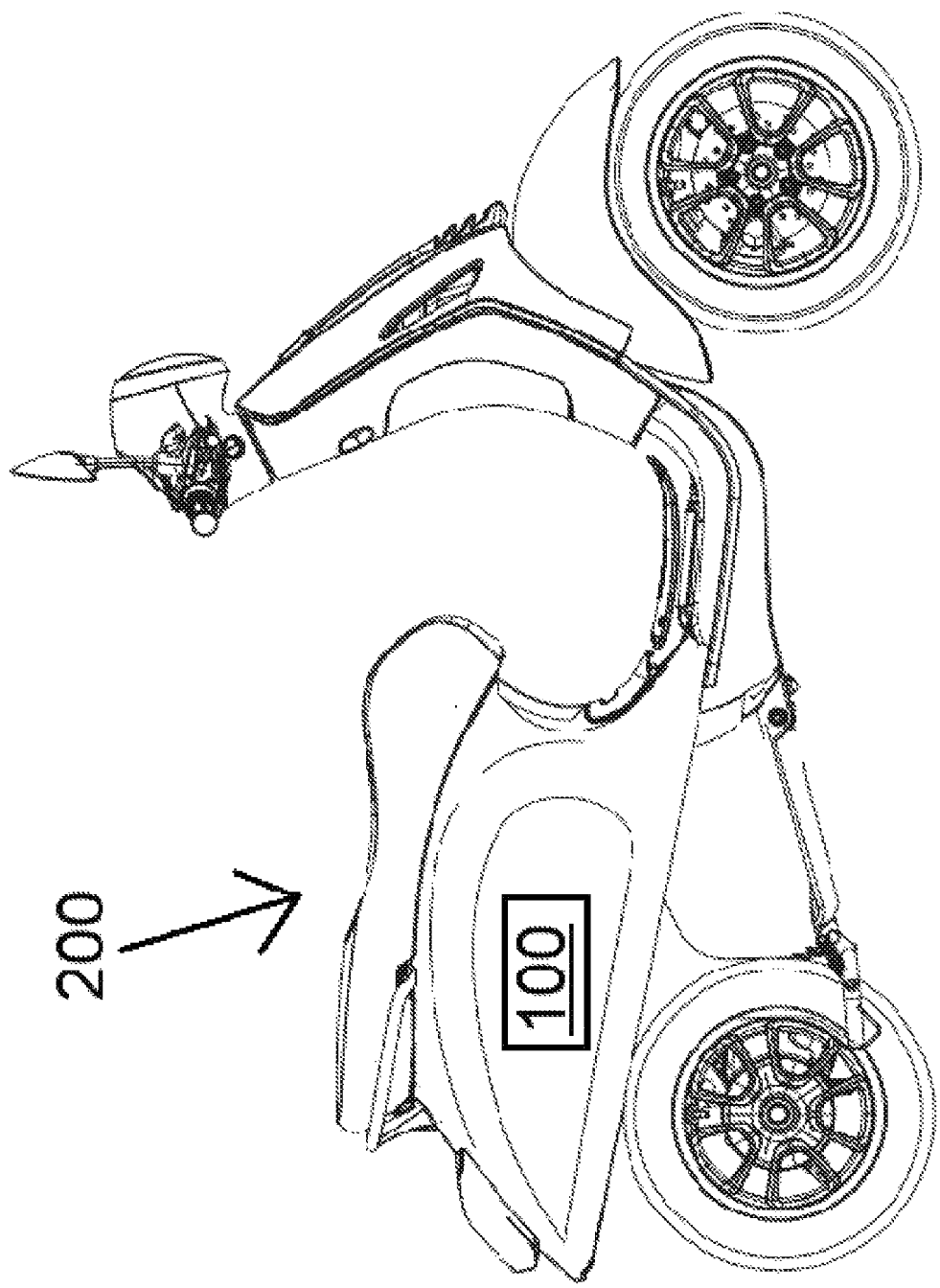
FIG. 4 is a diagrammatic view of a rideable saddle vehicle comprising an electric motor control system according to the invention.

With reference to FIG. 3, according to a preferred embodiment, the second unit 5 comprises a first processing module 51 which receives at the input the two signals 6.1, 7.1 which are characteristic of the speed of the motorcycle. The second unit 5 further comprises a second processing module 52 electrically connected to the first module 51. The first module 51 compares the two signals 6.1 and 7.1, received at the input, and generates a first reference signal 51.1 which is transmitted to the second module 52. Such reference signal 51.1 is generated based on the reliability of the signals 6.1, 7.1 at the input of the first module 51. Such reliability depends on the actual speed of the vehicle. In particular, according to a preferred embodiment, at low vehicle speeds or speeds lower than a first predetermined speed threshold, the second module 52 considers only the first signal 6.1 generated by the sensor means 10 to generate the first reference signal 51.1. For high speeds or speeds either lower than or equal to a second speed threshold, the second module 52 only considers the second signal 7.1 generated by sensor means 10 to generate the first reference signal 51.1 because the logic signal is more reliable. On the other hand, when the speed is between said first threshold and said second speed threshold, the two signals 6.1, 7.1 input into the first module 51 are substantially comparable and both are used. The first module 51 could be configured to signal a malfunction if the two signals differ significantly. In other words, at low speeds, the information (first signal 6.1) generated by the sensor means 10, i.e. the physical sensor, is considered more reliable, while at high speeds the speed value calculated by the computing unit 20 (second signal 7.1) is considered more reliable.

This first reference signal 51.1, which is also characteristic of the vehicle speed, is transmitted to the second processing module 52. The latter receives at the input at least a second reference signal 8 generated, or in any case set, by the driver of the vehicle. In essence, the driver communicates the intention to accelerate the vehicle or not by means of an appropriate command/instrument to the second unit 5. Based on the two reference signals 51.1 and 8 defined above, the second module 52 generates the control signal 5.1 transmitted to the input of the first unit 2. In essence, the second module 52 receives the first reference signal 51.1 validated by the first module 51 and the signal 8 which is characteristic of the driver's intention to accelerate. If, for example, the intention to accelerate is indeed such, then the second module 52 is required to increase the speed of electric motor 1. When maximum speed is reached, the second module 52 cancels the acceleration reference even if the user's acceleration request persists. In other words, the second module 52 does not consider the information contained in the second signal 8 beyond a preset maximum speed value (information contained in the first reference signal 51.1), acting in fact as a torque limiter.

Figure 2:
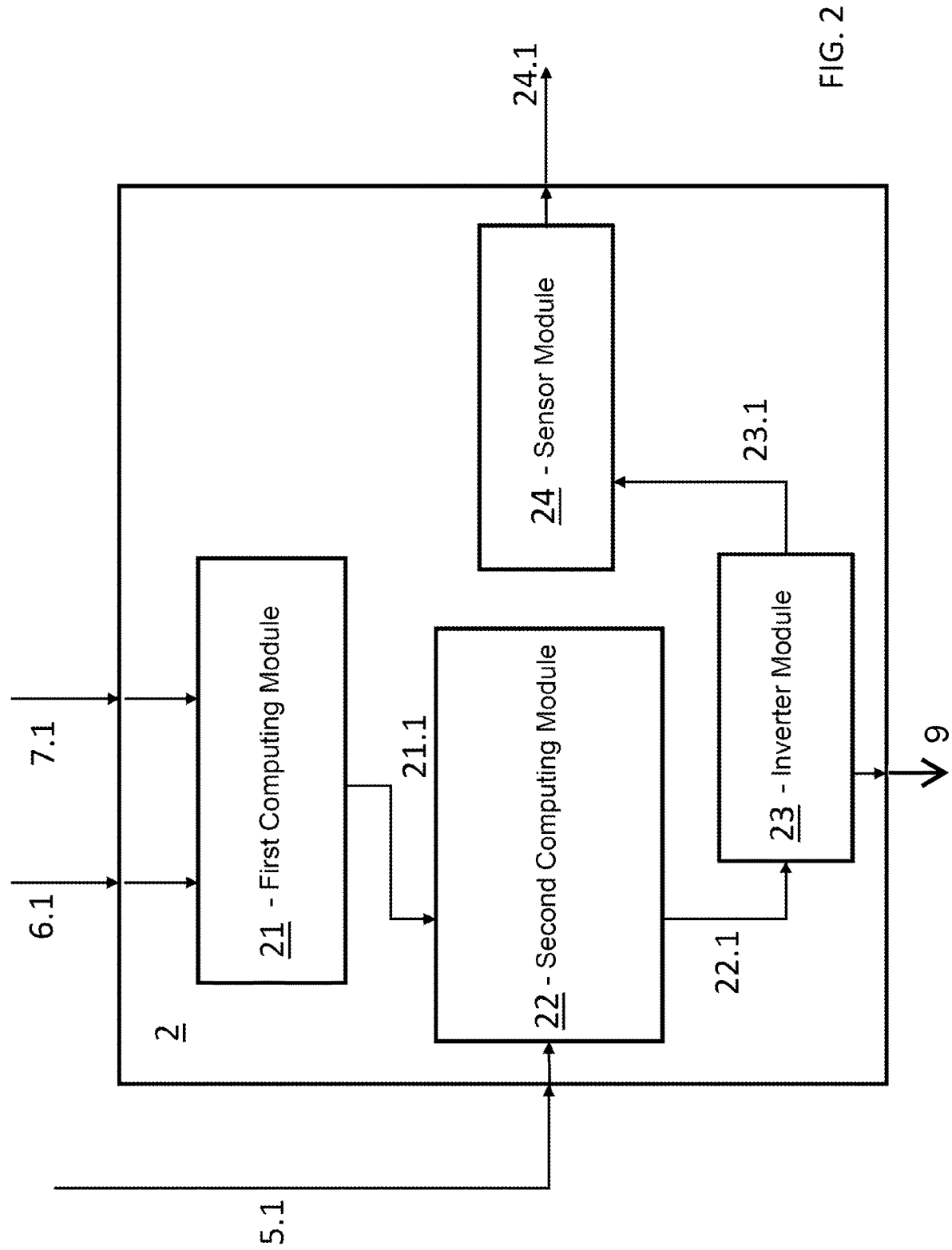
FIG. 2 is a block chart of one of the blocks in FIG. 1.

FIG. 2 is a block chart of a preferred design of the first supply and control unit 2 of the electric motor 1. The first unit 2 comprises at least one inverter module 23 electrically connected to the electric motor 1, through connections 9, to determine the actuation thereof. The inverter module 23 performs a function which is known per se by adjusting the current intensity for the windings of electric motor 1.

The first unit 2 comprises a sensor module 24 which detects the current intensity and voltage which are characteristic of the electric motor operation. The sensor module 24 is therefore electrically connected to inverter 23 to acquire at the input a signal 23.1 which is characteristic of the electrical quantities indicated above. The sensor module 24 generates a 24.1 signal which is characteristic of such quantities which is acquired at the input by the computing means 4 of the computing unit 20. Based on this signal sent by the sensor module 24, the computing means estimate the counter-electromotive force generated by the rotor movement in relation to the stator.

The first unit 2 further comprises a first computing module 21 which receives as input the two characteristic vehicle speed signals 6.1 and 7.1 generated by sensor equipment 10 and computing unit 20, respectively. The first module 21 processes the two signals 6.1 and 7.1 at the input generating a second reference signal 21.1 which is characteristic of the rotor position with respect to the stator.

This second reference signal 21.1 is received at the input from a second computing module 22 of the first unit 2. This second module 22 also receives at the input the control signal 5.1 sent by the second control unit 5 of the motorcycle. The second module 22 calculates the value of the currents which must pass through the stator windings and generates a control signal 22.1, preferably a PWM type current signal, which is received at the input from inverter 23. Based on this control signal, the inverter 23 supplies and controls the electric motor 1.

Again with reference to FIG. 2, according to a preferred embodiment, for generating the reference signal 21.1, which is characteristic of the instantaneous position of the rotor with respect to the stator, the first module 21 considers only the first signal 6.1 supplied by the sensor means 10 when the speed value is lower than said first speed threshold. When the speed value exceeds the second speed threshold, the first module 21 considers the second signal 7.1 generated by the computing unit 20.

In other words, to start at low speeds, the first module 21 takes advantage of the information provided by the sensor means 10 which can detect the speed of the vehicle 200 even in a zero-speed condition. When the motor is started, the information generated by the computing unit 20 also becomes usable. The value of said second threshold is established according to the configuration of sensor equipment 10 and of the computing unit 20, generally it can be a speed between 25 and 35 km/h, preferably equal to 30 km/h. Conversely, the first threshold can be a speed between 15 and 20 km/h. In the interval comprised between said first speed threshold and said second speed threshold, the first signal 6.1 becomes progressively less reliable than the second signal 7.1 as the speed of the vehicle increases.

The present invention is also related to a rideable saddle vehicle 200 comprising a control system according to the present invention. The expression "rideable saddle vehicle" indicates any two, three or four-wheeled vehicle equipped with a saddle for transporting one or more people and for which it is equipped with an electric motor. The vehicle according to the invention is therefore characterized by a control system based on the use of two different methods for determining the speed value of the electric motor 1 or the vehicle 200. The first method is therefore based on a detection of the rotor speed or position by means of a physical sensor, while the second method is based on the calculation of the counter-electromotive force generated by the rotation of the rotor with respect to the stator.

The use of these two different modes allows solving and achieving the preset objectives while giving a high degree of reliability to the control.

Various aspects and embodiments of the invention according to this description are defined by the following clauses:

1) A control system of an electrically actuated vehicle with ridable saddle, wherein said vehicle comprises an electric motor (1) which includes a stator and a rotor, wherein said control system comprises:
  a first control unit (5) of said vehicle;
  a second unit (2) for supplying and controlling said electric motor (1), wherein said second unit (2) supplies and controls said electric motor (1) on the basis of a control signal (5.1) sent by said first unit (5), said control signal (5.1) being characteristic of the torque required to said electric motor (1);
  sensor means (10) comprising a position sensor (3) and processing means (6) for processing the signal (3.1) supplied by said position sensor (3) and generating a first signal (6.1) which is characteristic of the speed of said vehicle;
  a computing unit (20) configured to generate a second signal (7.1) which is characteristic of the speed of said vehicle, wherein said computing unit (20) comprises first computing means (4) configured to calculate the angular position of said rotor with respect to said stator on the basis of the counter-electromotive force produced by said electric motor (1), and wherein said second signal (7.1) is generated on the basis of the value of said position calculated by said computing means (4);
  wherein said control signal (5.1) is generated on the basis of a predetermined reference torque signal (8) and on the basis of said first signal (6.1) and/or said second signal (7.1) which are characteristic of the speed of said vehicle and wherein said second unit (2) supplies and controls said electric motor (1) on the basis of said control signal (5.1), said first signal (6.1) and/or said second signal (7.1).

2) Control system according to clause 1, wherein said sensor means (10) comprise a position sensor (3) adapted to detect the position of said rotor with respect to said stator, and wherein said first signal (6.1) is generated on the basis of the value of said position detected by said position sensor (3).

3) Control system according to clause 1 or 2, wherein said computing unit (20) comprises processing means (7) electrically connected to said computing means (4), said processing means (7) receiving at the input a signal (4.1) sent by said computing means (4) and generating at the output said second signal (7.1) which is characteristic of the speed of said vehicle.

4) Control system according to any one of the clauses from 1 to 3, wherein said unit (5) comprises:
  a first processing module (51) which receives at the input said signals (6.1, 7.1) which are characteristic of the speed of said vehicle, wherein said first module (51) compares said signals generating at the output a reference signal (51.1) of the speed of said vehicle;
  a second processing module (52) which receives at the input said reference signal (51.1) generated by said first module (51) and a reference torque signal (8) set by the driver of said vehicle, said second module (52) generating at the output said control signal (5.1) which is characteristic of the torque required to said electric motor (1).

5) Control system according to clause 4, wherein under a predetermined speed value, said second module (52) only considers said first signal (6.1) to generate said first reference signal (51.1), and wherein, above said predetermined speed value, said second module (52) considers only said second signal (7.1) to generate said reference signal (51.1).

6) Control system according to any one of the clauses from 1 to 5, wherein said second unit (2) comprises an inverter module (23) electrically connected to said electric motor (1) to determine the actuation thereof.

7) Control system according to clause 6, wherein said second unit (2) comprises a sensor module (24) electrically connected to said inverter module (23) and to said computing means (4) of said computing unit (20), wherein said sensor module comprises sensors which detect the electric parameters of said inverter module (23) and supplies a signal which is characteristic of the value of said electric parameters to said computing means (4).

8) Control system according to any one of the clauses from 6 to 7, wherein said second unit (2) comprises:
  a first computing module (21) which receives at the input said signals (6.1, 7.1) which are characteristic of the speed, wherein said first computing module (21) generates a signal (21.1) which is characteristic of the position of said rotor with respect to said stator;
  a second computing module (22) which receives at the input said signal (21.1) generated by said first computing module (21) and said control signal (5.1) generated by said first control unit (5), wherein said second computing module (22) generates a control signal (22.1) received at the input by said inverter module (23).

9) Control system according to clause 8, wherein, when the speed of said vehicle is lower than a predetermined value, said first computing module (21) generates said reference signal (21.1) which is characteristic of the position of said rotor considering only said first signal (6.1) and wherein when said speed of said vehicle is higher than said predetermined value, said second computing module (22) generates said reference signal (21.1) considering only said second signal (7.1).

10) A ridable saddle vehicle (200) with electric drive, wherein said vehicle comprises an electric motor (1) which includes a stator and a rotor and a control system of said electric motor according to any one of the clauses from 1 to 9.

The invention claimed is:

1. A rideable saddle vehicle comprising:
an electric traction motor which includes a stator and rotor;
a first vehicle speed measurement sensor configured to generate a first signal which is characteristic of a sensor detected speed of the vehicle; and
a control system of the vehicle comprising;
a first unit which supplies and controls power to said electric traction motor on a basis of a first control signal, said first control signal being characteristic of torque selectively required by said electric traction motor; and
a computing unit configured to generate a second signal which is characteristic of an estimated speed of the vehicle, wherein said computing unit comprises first computing means configured to calculate an angular position of said rotor with respect to said stator on a basis of a counter-electromotive force produced by said electric traction motor, and wherein said second signal is generated on a basis of a value of said angular position calculated by said first computing means;
wherein said first control signal is generated on a basis of a torque signal and on the basis of at least one of said first signal and said second signal, which are respectively characteristic of the sensor detected and estimated speeds of said vehicle.

2. The vehicle according to claim 1, wherein said first control signal is generated only on the basis of said torque signal and on the basis of said first signal which is characteristic of the sensor detected speed of said vehicle, when the sensor detected speed of the vehicle is lower than a first speed threshold.

3. The vehicle according to claim 2, wherein said first control signal is generated only on the basis of said torque signal and on the basis of said second signal which is characteristic of the estimated speed of said vehicle, when the sensor detected speed of the vehicle is higher than or equal to a second speed threshold.

4. The vehicle according to claim 3, wherein said first control signal is generated on the basis of said torque signal and on the basis of said first signal and said second signal which are respectively characteristic of the sensor detected and estimated speeds of said vehicle, when the sensor detected speed of the vehicle is greater than or equal to said first speed threshold and lower than said second speed threshold.

5. The vehicle according to claim 4, wherein said first unit supplies and controls current to said electric traction motor according to at least one of said first signal and said second signal, and said first control signal sent by a second control unit of said vehicle.

6. The vehicle according to claim 5, wherein said second control unit comprises:
a first processing module, which receives at an input, said first and second signals which are respectively characteristic of the sensor detected and estimated speeds of said vehicle, wherein said first processing module compares said first and second signals and generates, at an output, a first reference signal of associated with the speed of said vehicle; and
a second processing module, which receives at an input, said first reference signal generated by said first processing module and a reference torque signal that is selectively set by a driver of said vehicle, said second processing module generating, at an output said first control signal which is characteristic of the torque required to said electric traction motor.

7. The vehicle according to claim 6, wherein under said first speed threshold, said second processing module only considers said first signal to generate said first reference signal, and wherein, above said second speed threshold, said second processing module considers only said second signal to generate said first reference signal.

8. The vehicle according to claim 5, wherein said first unit comprises an inverter module electrically connected to said electric traction motor to determine actuation thereof.

9. The vehicle according to claim 8, wherein said first unit comprises a sensor module electrically connected to said inverter module and to said first computing means of said computing unit, wherein said sensor module comprises sensors which detect electric parameters of said inverter module and supplies a signal which is characteristic of the value of said electric parameters to said first computing means.

10. The vehicle according to claim 8, wherein said first unit comprises:
a first computing module, which receives at an input, said first and second signals which are respectively characteristic of the sensor detected and estimated speeds of the vehicle, wherein said first computing module generates a rotor position signal which is characteristic of positioning of said rotor with respect to said stator; and
a second computing module, which receives at an input, said rotor position signal generated by said first computing module and said first control signal generated by the second control unit, wherein said second computing module generates a second control signal which is received by said inverter module.

11. The vehicle according to claim 1, wherein said first vehicle speed measurement sensor comprises:
a position sensor configured to detect rotor position relative to the stator; and
first processing means for processing a signal supplied by said position sensor and generating said first signal which is characteristic of the sensor detected speed of said vehicle on the basis of the value of said rotor position detected by said position sensor.

12. The vehicle according to claim 1, wherein said computing unit comprises second processing means that is electrically connected to said first computing means, said second processing means receiving at an input a signal sent by said first computing means and generating at an output said second signal which is characteristic of the estimated speed of said vehicle.

* * * * *